3,459,718
QUATERNARY AMMONIUM HALIDES OR TERTIARY AMINE HYDROHALIDES AS MOLECULAR WEIGHT REGULATORS IN COORDINATION CATALYST POLYMERIZATION SYSTEMS FOR OLEFINS
Frederick C. Loveless, Oakland, N.J., assignor to Uniroyal, Inc., a corporation of New Jersey
No Drawing. Filed Aug. 16, 1965, Ser. No. 480,124
Int. Cl. C08f 15/40, 1/42, 1/56
U.S. Cl. 260—80.78
14 Claims

ABSTRACT OF THE DISCLOSURE

The invention relates to a method of regulating the molecular weight of the product in the solution interpolymerization of ethylene and propylene by use of a soluble catalyst system based on an alkylaluminum sesquichloride and vanadium oxytrichloride and, as a regulator, certain quaternary ammonium halides and tertiary amine hydrohalides wherein from 0.1 to 20 moles of said regulator are used per mole of vanadium.

---

This invention relates to the preparation of ethylene-propylene interpolymer rubbers, and more particularly it relates to the regulation of the molecular weight of such rubbers.

Synthetic, rubbery ethylene-propylene interpolymers are important and valuable materials, especially the unsaturated, terpolymeric, sulfur-vulcanizable forms of such interpolymers containing copolymerized therein a non-conjugated diene in addition to the ethylene and propylene. The invention is concerned with an improvement in a highly preferred method of making such interpolymers in solution, using a soluble catalyst based on an alkyl aluminum sesquichloride ($R_3Al_2Cl_3$) and vanadium oxytrichloride as disclosed in Belgian Patent 622,040, Sept. 3, 1962, United States Rubber Company. While such a catalyst system has many advantages, nevertheless it has been desirable to improve still further the polymerization method. In particular, it has been desirable to provide a way of regulating the molecular weight of the polymer, so that a material of lower molecular weight and easy processability can be obtained. In anionic coordination polymerization, the molecular weight of the polymer produced may be varied by changing the catalyst concentration, monomer concentration, and other factors which also generally affect polymer yield. Frequently, these polymerizations lead to undesirably high molecular weight material. It is desirable to obtain a material or so-called regulator which can be added to the reaction mixture and will result in reduced molecular weight without the necessity of changing any of the other factors mentioned above. It is further desirable that such regulators should not have a deleterious effect on the "polymerization"—the yield and quality of the product should be equivalent to that of polymer produced in the absence of molecular weight regulator.

According to the present invention, it has been found that certain quaternary ammonium halides and tertiary amine hydrohalides are capable of regulating the solution interpolymerization of ethylene and propylene by a soluble catalyst system based on an alkylaluminum sesquichloride and vanadium oxytrichloride ($VOCl_3$). It is to be emphasized that the catalyst system employed in the invention is of the soluble kind (i.e., soluble in the monomers and/or in the usual solvents used as polymerization media, e.g., hexane), as distinguished from insoluble or heterogeneous catalysts. The solubility of the presently employed catalyst is a consequence of the particular ingredients employed, and their proportions, specifically the relatively high ratio of the aluminum compound to the vanadium compound. The molar ratio of aluminum to vanadium is at least 5:1, and preferably at least 10:1; higher ratios such as 20:1, 35:1, 50:1, or even higher, may also be used. If desired, very high ratios of aluminum to vanadium (e.g. 200:1 or higher) may be employed, especially in those cases where the concentration of vanadium compound is very small. The alkylaluminum sesquichloride that forms the catalyst system along with the vanadium oxytrichloride is frequently ethylaluminum sesquichloride, although other alkylaluminum sesquichlorides may be used, including those in which the alkyl group has from 1 to 8 carbon atoms (preferably 1 to 4 carbon atoms). The sesquichloride can be provided in any conventional manner, for example by reacting dialkylaluminum monochloride ($R_2AlCl$) with monoalkylaluminum dichloride ($RAlCl_2$) in equimolar proportions so as to produce the sesquichloride ($R_3Al_2Cl_3$), or at least reacting them in such proportions as to produce a substantial content of sesquichloride.

The quaternary ammonium halides and tertiary amine hydrohalides that may be used as regulators in the present invention are those in which one of the radicals attached to the nitrogen has a hydrocarbon group containing from 8 to 30 carbon atoms, and the halogen is chlorine, bromine or iodine. The regulator molecule generally contains less than 36 carbon atoms. Examples of such regulators are lauryl pyridinium bromide, cetyl pyridinium chloride, dodecylbenzyl triethylammonium chloride, octadecyl dimethylamine hydrochloride, dodecylbenzyl pyridinium chloride, trimethyl dodecylbenzyl ammonium chloride, dimethyl dodecylbenzyl amine hydrochloride. The amount of such regulator will be from 0.1 to 20 moles, preferably from 1 to 10 moles, per mole of vanadium. The regulators may enter the reaction mixture as solids or dissolved in a solvent such as benzene, toluene, chlorobenzene, tetrachloroethylene or heptane.

In the practice of the invention, the catalyst ingredients, i.e., the alkylaluminum sesquichloride and vanadium oxytrichloride, are generally combined in the presence of at least a portion of the monomers. The regulator of the invention may be added to the solvent before saturation with the monomers, or to the monomers, or after the catalyst ingredients have been combined in the presence of the monomers, or simultaneously with the catalyst ingredients. While the present invention is applicable to the production of binary interpolymers of ethylene and propylene, as in British Patent 886,368 of United States Rubber Company, Jan. 3, 1962, a preferred practice of the invention is in the production of unsaturated, sulfur-vulcanizable, rubbery terpolymers of ethylene, propylene and a non-conjugated diene such as dicyclopentadiene, methylcyclopentadiene dimer, 1,4-hexadiene, 11-ethyl-1, 11-tridecadiene, 1,9-octadecadiene, 1,5-cyclooctadiene, or other suitable copolymerizable dienes such as are disclosed in British Patent 880,904 of Dunlop Rubber Company, Oct. 25, 1961; U.S. Patents 2,933,480, Gresham and Hunt, Apr. 19, 1960 and 3,000,866, Tarney, Sept. 19, 1961; and Belgian Patents 623,698 and 623,741 of Montecatini, Feb. 14, 1963. Preferred terpolymers contain from about 1 to about 25% (more preferably about 2 to about 15%) by weight of a non-conjugated diene such as dicyclopentadiene or the like; the remaining portion of the terpolymer contains propylene and ethylene in the weight ratio in the range from about 15/85 to about 85/15, by weight. Ethylene-propylene binary interpolymers have the same weight ratio of propylene and ethylene.

The polymerization is conveniently carried out in a solvent, although an added solvent is not essential; the monomers being polymerized can serve as the solvent. In general, the normal solvents for coordination ionic polymerization can be used. These include the aromatic hydrocarbons, aliphatic hydrocarbons, chlorobenzene, tetrachloroethylene, and any other inert solvent which will not destroy the catalyst. The temperature is not critical and may be from 0° C. to 100° C. The procedure is the same as in conventional practice as shown for example in British Patent 886,368, Jan. 3, 1962 and Belgium Patent 622,040, Sept. 3, 1962, United States Rubber Company.

The following illustrates the invention:

The following polymerization procedure A without molecular weight regulator, being representative of prior known methods, is given for comparison, and also is used in succeeding Examples 1 to 5 with the addition of various regulators to illustrate the invention.

A dry, 2-liter, 3-necked flask was equipped with stirrer, thermometer, gas inlet tube, and vertical condenser mounted with a gas outlet tube. The flask was kept filled with dry argon prior to polymerization. Into this flask was introduced 700 ml. of pure n-heptane. The solvent was then saturated with ethylene and propylene with a continuous flow of 2 liters per minute of each gas for ten minutes. The gas flow was maintained at that rate during the polymerization. To the saturated monomer solution was added 1.0 mmole (millimole) of $(C_2H_5)_3Al_2Cl_3$ in 6.7 ml. of n-heptane and 0.1 mmole of $VOCl_3$ in 4 ml. of n-heptane, and polymerization began immediately. During this polymerization at room temperature (20° C.), the solution became hazy after about 5 minutes, and after 10 minutes noticeable amounts of insoluble polymer had formed 30 minutes after the $VOCl_3$ was added, the polymerization was terminated by addition of 15 ml. of isopropanol, then 20 ml. of a 5% solution of antioxidant, 2,2'-methylene bis(4-methyl-6-t-butylphenol), were added. The polymer solution was filtered through cloth to separate the insoluble polymer, and the filtered solution was mixed into a 50/50 (by volume) mixture of methanol and acetone. The flocculated polymer was chopped in a blendor, dried and weighed. The insoluble polymer was treated in a similar manner. The weight of the soluble polymer was 9.0 grams, and the insoluble polymer weighed 0.4 gram. The intrinsic viscosity of the soluble polymer in tetralin at 135° C. [I.V.(135° C.)] was 3.88. The estimated molecular weight is about 400,000. The weight percent (wt. percent) of propylene in the polymer was 40.

Example 1

Procedure A was followed, except that 1.0 mmole of powdered lauryl pyridinium bromide was added to the solvent prior to saturation with monomers. Upon catalyst addition, polymerization proceeded normally, except that viscosity was noticeably lower and no insoluble polymer was formed.

The yield was 9.0 grams. The I.V. (135° C.) was 1.78. The estimated molecular weight is about 125,000. The wt. percent of propylene in the polymer was 47.

Example 2

Procedure A was followed, except that 0.2 mmole of powdered cetyl pyridinium chloride was added to the solvent prior to saturation with monomers. Upon catalyst addition, polymerization proceeded normally, except that the viscosity was noticeably lower and no insoluble polymer was formed.

The yield was 9.4 grams of polymer. The I.V. (135° C.) was 2.46. The estimated molecular weight is about 200,000. The wt. percent of propylene was 47.

Example 3

Procedure A was followed, except that 1.0 mmole of dedecylbenzyl triethyl-ammonium chloride powder was added to the solvent prior to saturation with monomers. After polymerization, 10.9 grams of polymer (all soluble) was isolated. The I.V. (135° C.) was 2.85. The wt. percent of propylene was 47.

Example 4

Procedure A was followed, except that 0.2 mmole of dodecylbenzyl triethyl ammonium chloride (as a 0.1 N benzene solution) was added to the solvent prior to saturation with monomers. After polymerization, 7.85 grams of polymer was isolated. The I.V. (135° C.) was 2.04. The wt. percent of propylene was 47.

Example 5

Procedure A was followed, except that 1.0 mole of octadecyl dimethylamine hydrochloride was added to the solvent prior to saturation with monomers. After polymerization, 6.15 grams of polymer was isolated. The I.V. (135° C.) was 1.65. The wt. percent of propylene was 49.

It may be seen from the above examples that the quaternary ammonium halides and tertiary amine hydrohalides are very effective regulators in the polymerization of synthetic, rubbery ethylene-propylene interpolymers catalyzed by alkyl aluminum sesquichloride and vanadium oxytrichloride.

In view of the many changes and modifications that may be made without departing from the principles underlying the invention, reference should be made to the appended claims for an understanding of the scope of the protection afforded the invention.

Having described my invention, what I claim and desire to protect by Letters Patent is:

1. In a method of solution interpolymerizing monomers comprising ethylene and propylene by means of a soluble catalyst comprising an alkylaluminum sesquichloride and vanadium oxytrichloride in a molar ratio of aluminum to vanadium which is at least 5:1, the improvement comprising carrying out the said interpolymerization in the presence of from 0.1 to 20 moles per mole of vanadium of a quaternary ammonium halide or a tertiary amine hydrohalide in which one of the radicals attached to the nitrogen has a hydrocarbon group containing at least 8 carbon atoms, to regulate the molecular weight of the interpolymer.

2. A method as in claim 1 in which a copolymerizable non-conjugated diene is interpolymerized with the ethylene and propylene.

3. A method as in claim 2 in which the diene is dicyclopentadiene.

4. A method as in claim 1 in which the alkyl aluminum sesquichloride is ethylaluminum sesquichloride.

5. A method as in claim 1 in which the regulator is lauryl pyridinium bromide.

6. A method as in claim 1 in which the regulator is cetyl pyridinium chloride.

7. A method as in claim 1 in which the regulator is dodecylbenzyl triethyl ammonium chloride.

8. A method as in claim 1 in which the regulator is octadecyl dimethylamine hydrochloride.

9. The method of interpolymerizing ethylene, propylene and a copolymerizable non-conjugated diene in solution in an inert organic solvent comprising introducing separately catalyst ingredients into said solvent containing at least a portion of the said monomers, said catalyst ingredients being alkylaluminum sesquihalide and vanadium oxytrichloride in a molar ratio of aluminum to vanadium which is at least 5:1, to form a soluble catalyst in situ in the presence of the monomers, and also introducing into the solvent containing at least a portion of the said monomers from 0.1 to 20 moles per mole of vanadium of a regulator which is selected from quaternary ammonium halides and tertiary amine hydrohalides in which one of the radicals attached to the nitrogen is a hydrocarbon group containing at least 8 carbon atoms, whereby the said monomers interpolymerize to form an interpolymer of the said monomers, the molecular weight of the interpolymer being less than it would be in the absence of said regulator.

10. The method of claim 9 in which the alkylaluminum sesquihalide is ethylaluminum sesquichloride, and the diene is dicyclopentadiene.

11. The method of claim 10 in which the regulator is lauryl pyridinium bromide.

12. The method of claim 10 in which the regulator is cetyl pyridinium chloride.

13. The method of claim 10 in which the regulator is dodecylbenzyl triethyl ammonium chloride.

14. The method of claim 10 in which the regulator is octadecyl dimethylamine hydrochloride.

References Cited

UNITED STATES PATENTS

| | | | |
|---|---|---|---|
| 3,069,446 | 12/1962 | Argabright | 260—429.5 |
| 3,147,241 | 9/1964 | Moberly | 260—93.7 |
| 3,205,209 | 9/1965 | Perry | 260—93.7 |
| 3,216,989 | 11/1965 | Meyer | 260—93.7 |
| 3,277,069 | 10/1966 | Natta | 260—93.7 |
| 3,116,274 | 12/1963 | Boehm | 260—94.9 |
| 3,162,620 | 12/1964 | Gladding | 260—80.5 |
| 3,243,420 | 3/1966 | Caunt | 260—93.7 |

JOSEPH L. SCHOFER, Primary Examiner

ROGER S. BENJAMIN, Assistant Examiner

U.S. Cl. X.R.

252—429; 260—88